United States Patent Office 3,819,669
Patented June 25, 1974

3,819,669
PROCESS FOR PREPARING LINEAR FATTY ACIDS BY CARBOXYLATION OF OLEFINS
John F. Knifton, Poughquag, N.Y., assignor to Texaco Inc., New York, N.Y.
No Drawing. Filed Feb. 2, 1972, Ser. No. 223,015
Int. Cl. C07c 67/00, 51/14
U.S. Cl. 260—410.9 R                22 Claims

ABSTRACT OF THE DISCLOSURE

This invention concerns a process for preparing linear fatty acids and esters from alpha-olefins and carbon monoxide in the presence of homogeneous platinum complexes.

STATEMENT OF INVENTION

This invention relates to the catalytic conversion of alpha-olefins to linear fatty acids or esters.

More particularly, this invention concerns the carboxylation of alpha-olefins with carbon monoxide in the presence of hydroxyl-containing reactants, under elevated reaction conditions of temperatures and pressures, using ligand stabilized platinum(II)-Group IV–B[1] metal halide catalysts.

Carboxylation, as used throughout this disclosure and claims, refers to the process of preparing linear saturated linear carboxylic acids or their esters from alpha-olefins substrates. Linear paraffinic carboxylic esters are of the type: RCOOR′, wherein R is a saturated alkyl radical containing 3 to 40 carbon atoms, wherein R′ is an aliphatic or aromatic radical.

BACKGROUND OF THE INVENTION

Carboxylic acids are characterized by the presence of one or more carboxyl groups in an organic molecule. The acids are usually written as COOH. The hydrogen atom of this group may be displaced and appear as a hydronium ion thereby justifying by theory the term acid.

The saturated (fatty) carboxylic acids of the linear type are typical in their reactions as acids in that they generally form solid metal salts of the type RCOOM, in which R is as defined above and M is a metal. These acids readily form esters in their reaction with most alcohols, glycols or polyols in the presence of acidic catalysts. They can be dehydrated to their anhydrides and they react with chlorine or bromine to form halogen substituted acids.

The saturated linear carboxylic acids are prepared by a large number of general procedures such as the oxidation of primary alcohols or aldehydes, the catalytic hydrolysis of nitriles, the reaction of Grignard reagents with carbon dioxide as well as by several special procedures for specific acids including fermentation, the acetoacetic ester synthesis, the malonic ester synthesis and the Reformatsky reaction.

In recent years, with the availability of large quantities of alpha-olefins from wax cracking at relatively low costs, alpha-olefins have been suggested as starting materials for fatty acid production.

The carboxylation of olefins in the presence of metal carbonyls or carbonyl precursors to produce carboxylic acids or esters is old in the literature, originally having been developed by Reppe[2] and his coworkers. However, the nickel and iron salts or their carbonyl precursors suffer from some major drawbacks. These drawbacks include the high toxicity of the carbonyl type reagents, the production of a variety of undesirable side products due to polymerization, isomerization and reduction of the olefin substrates, and, most importantly, the production of large quantities of branched acid isomers in addition to the desired linear fatty acid product.

It is now known that the production of the polymeric, isomeric and reduced products can be avoided through the use of alternative catalyst systems[3] which are active under mild reaction conditions. However, even so, none of the described catalytic systems disclosed offers the desired combination of excellent yields of linear fatty acid products together with a high conversion of the substrate olefin. For example, the water-soluble platinum catalysts of the Jenner et al. patent[2] are applicable only to olefins containing up to 6 carbon atoms and the claimed process results in the preparation of primarily branched acid isomers. In view of these shortcomings, until this time, none of the prior art systems offer the desired combination of good yields, good conversions and good selectivity to the linear product.

Desirably, a commercially attractive process would readily activate the alpha (α) olefins at relatively mild conditions, without catalyzing their isomerization to internal isomeric products or reduction to the paraffins.

Ideally, the carboxylation process would form labile carbonyls by direct formation of a CO complex without the need for employing the toxic iron group carbonyls, and would be sufficiently sterically selective to assure that CO addition would preferentially take place at the terminal carbon of the olefin substrate.

Recently Kehoe et al.[4] have reported the synthesis of $C_4$–$C_{15}$ fatty acids in about 80% yields with about 80% linearity using a bimetallic platinum(IV)-tin catalyst system. More specifically the catalyst system consisting of platinic acid [$H_2PtCl_6$] complexed with excess stannous chloride. Of more pertinence was the statement on the second page of the reference by the authors that the platinum ligand stabilized catalyst complexes pioneered by Bailar[5] for the selective hydrogenation of multiunsaturated fats exhibited *poor activity* for the carboxylation of alpha-olefins. Inasmuch as applicants have found that ligand stabilized bimetallic platinum(II)-Group IV–B metal halide complexes are eminently suited for the carboxylation of alpha-olefins having at least a carbon range of $C_3$–$C_{40}$ to produce linear fatty acids with selectivities greater than 90%, applicants' success in the carboxylation reaction was completely unexpected and represents a teaching away from the closest art.

In the broadest practice of this invention, linear carboxylated products selected from the group consisting of linear paraffinic (alkyl) carboxylic acids and linear paraffinic esters of said acids, containing at least 4 carbon atoms are produced from the bimetallic, ligand stabilized platinum(II)-Group IV–B halide homogeneous complex catalysis by the addition of carbon monoxide to alpha

---

[1] Group IV–B elements as defined in "Advanced Inorganic Chemistry" F. A. Cotton and G. Wilkinson (1966).
[2] This work is reviewed by C. W. Bird, Rev. *62*, 283 (1962).
[3] U.S. 2,876,254 (Jenner et al.).
[4] L. J. Kehoe et al., J. Org. Chem; *35*, 2846 (1970).
[5] J. Am. Oil Chem. Soc. *47*, 475 (1970).

(α) olefins in the presence of hydroxyl-containing reactant under elevated temperatures and pressure, in an oxygen-free environment, until the formation of the desired carboxylated products are formed.

In the narrower practice of this invention, linear paraffinic carboxylated products selected from the group consisting of linear paraffinic acids and linear paraffinic esters of said acids, containing at least 4 carbon atoms are produced from the catalytic reaction of carbon monoxide with alpha (α)-olefins by a process comprising the following steps:

(a) Admixing each mole of alpha-olefin to be carboxylated with at least one hydroxyl-containing reactant, at least a catalytic quantity of homogeneous, ligand-stabilized platinum (II) catalyst complexed with excess Group IV–B metal halide, said ligand being selected from Groups V–B, VI–B of the Periodic Table and their mixtures in an oxygen-free environment, in the presence of a pressurized carbon monoxide atmosphere, to form a reaction mixture, and (b) Heating said pressurized reaction mixture at 25° C. and above until substantial carboxylation of the alpha-olefin to the desired linear paraffinic (fatty) carboxylated product is formed and isolating the carboxylated products contained therein.

In a more specific embodiment of the above-described invention, linear paraffinic acids are produced from the reaction of carbon monoxide with alpha-olefins by a process comprising the following steps:

(a) Admixing each mole of alpha-olefin to be carboxylated to linear paraffinic acids, with at least a stoichiometric quantity of water [6], a catalytic quantity of homogeneous ligand stabilized platinum(II) catalyst and excess Group IV–B metal halide in an oxygen-free environment, in the presence of pressurized carbon monoxide, to form a reaction mixture, and (b) Heating said reaction mixture at 25° C. and above until the desired linear, paraffinic carboxylic acid is formed, and isolating the paraffinic carboxylic acid contained therein.

In another specific embodiment of the above-described invention, linear, paraffinic acids are produced from the reaction of carbon monoxide with alpha-olefins by a process comprising the following steps:

(a) Admixing each mole of alpha-olefin to be carboxylated to the esters of linear paraffinic carboxylic acids, with at least stoichiometric quantities of hydroxyl-containing paraffinic reactant [7], selected from the group consisting of paraffinic alkanols, glycols, polyols and mixtures thereof, at least a catalytic quantity of homogeneous, ligand stabilized, platinum(II) catalyst complexed with excess Group IV–B metal halide, in an oxygen-free environment, in the presence of pressurized carbon monoxide, to form a reaction mixture, and (b) Heating said reaction mixture at 25° C. and above until the desired ester is formed, and isolating the ester of the linear paraffinic acid contained therein.

In order to further aid in the understanding of this invention, the following additional disclosure is submitted:

A. Process Sequence and Variations. In general, the components of the carboxylation reaction mixture, including optional inert solvent, water or alkanol, alpha-olefin and catalyst may be added in any sequence as long as good agitation is employed to provide a homogeneous reaction mixture. For example, the following represent some variations insofar as the catalyst, sequence of CO addition and heating that may be made without departing from the inventive process. These modifications include:

(1) The catalyst may be preformed and added preformed to the mixture of the other components to form the reaction mixture.

---
[6] Based upon the amount of alpha-olefin present.
[7] Based upon the amount of alpha-olefin present.

(2) Preferably, to minimize stability problems with the catalyst, the catalyst is best formed *in situ* usually in the presence of excess Group IV–B halide followed by the addition of ligand stabilized platinum(II) salt to form the reaction mixture.

(3) After using either variation 1 or 2 the catalyst containing reaction mixture is pressurized with CO and heated. If water is present in the reaction mixture, then the principal product will be a linear fatty acid having one more carbon atom than the α-olefin charged. If an alkanol is present, the corresponding ester of the carboxylic acid will be formed. The formation of the ester is useful both in product applications, and its ease in providing for rapid chromatographic analysis.

(4) After using either variation 1 or 2, the catalyst solution containing the α-olefin and either water of an alkanol can be heated first in an inert atmosphere or under mild pressure of CO (10–100 p.s.i.g.), then pressurizing to the desired extent with carbon monoxide to form the desired linear carboxylic acid or ester.

(5) A substantial process variation that can be employed is when the catalyst is formed *in situ* in a solvent containing water or another hydroxyl-containing reactant, the catalyst containing solution is heated to the required temperature under an inert atmosphere or under a lower than required pressure of CO, and then the olefin and additional carbon monoxide are added together and the required CO pressure maintained until the ester (or free acid) product is formed.

B. Ligand Stabilized Platinum(II) Catalyst Complex— The use of ligand stabilized platinum(II) catalyst systems complexed with a Group IV–B metal halide is essential to the inventive carboxylation process. The key elements of the ligands used to stabilize the platinum(II) catalyst are selected from those elements of Group V–B and/or VI–B as set forth in the "Periodic Chart of the Elements," taken from the text, Advanced Inorganic Chemistry, by F. A. Cotton and G. Wilkinson, 2nd Edition, 1966. These elements are selected from the group consisting of nitrogen, arsenic, antimony, bismuth, sulfur, selenium and phosphorous. Illustrative of ligands used to stabilize the platinum(II) catalysts are: $As(C_6H_5)_3$, $Sb(C_6H_5)_3$, $Bi(C_6H_5)_3$, $P(C_6H_5)_3$, $P(CH_3)_2(C_6H_5)$, $As(n\text{-}C_4H_9)_3$, $P(p\text{-}CH_3\text{-}C_6H_4)_3$, $P(n\text{-}C_4H_9)_3$, $(C_6H_5)_2P(CH_2)_2P(C_6H_5)_2$

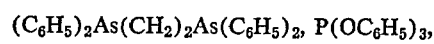

$(C_6H_5)_2As(CH_2)_2As(C_6H_5)_2$, $P(OC_6H_5)_3$, pyridine, ethylenediamine and 1,10 - phenanthroline, $S[C_6H_5]_2$, $Se[C_6H_5]_2$.

Illustrative of the Group IV–B metal halides that can be complexed with the ligand stabilized platinum(II) to form an active carboxylation catalyst are tin(II) chloride, tin(II) bromide, tin(II) iodide, lead chloride, germanium-(II) chloride and lead iodide.

C. Ligand Stabilized Platinum(II)-Group IV–B metal halide Catalyst Complex—The following complexes are among the many ligand stabilized platinum(II)-Group IV–B metal halide complexes which can be used in the inventive carboxylation as the catalyst system:

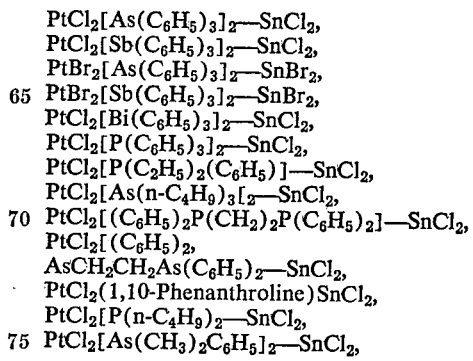

PtCl$_2$[P(p-CH$_3$·C$_6$H$_4$)$_3$]$_2$—SnCl$_2$,
PtCl$_2$[NH$_2$(CH$_2$)$_2$NH$_2$]—SnCl$_2$,
PtCl$_2$[S(C$_6$H$_5$)$_2$]$_2$—SnCl$_2$ as well as the corresponding stannous iodide lead chloride complexes and certain germanium(II) chloride complexes.

The ligand-stabilized, platinum(II) halide Group IV–B metal halide complexes are known in the literature and methods for their preparation have been described.[8] One convenient mode of preparation *in situ* is to mix a solution of platinum(II) halide complex such as

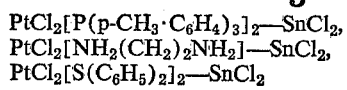

with a large molar excess of Group IV–B metal halide, preferentially SnCl$_2$. While no structural configuration is advocated, nor is the success of the catalyst postulated upon a given structure, it is assumed that a typical ligand-stabilized platinum(II)-stannous chloride complex such as the "triphenyl arsine" can be represented as:

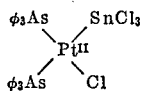

wherein $\phi$ is the symbol for (C$_6$H$_5$)

D. Ratio of Stannous Halide to Ligand Stabilized Platinum(II) Catalyst—While the molar ratio of stannous chloride to the ligand stabilized platinum(II) halide is not critical, the experimental work performed indicates that at least 1 mole of stannous chloride for each mole of platinum(II) chloride complex is required for reproducibility and good selectivity. Preferably a ratio of from 5 to 10 moles of stannous chloride for each mole of platinum(II) complex has been established to give the optimum amount of linear fatty acid ester based upon the carboxylation of 1-heptene. Table V documents this work.

E. Ratio of Ligand Stabilized Platinum(II) Halide—Catalyst Complex to Alpha Olefin Substrate—Experimental work indicates that a molar ratio of up to 500 moles to 1000 moles of alpha olefin per mole of platinum(II) catalyst complex can be employed in most instances where alpha-olefins (as typified by 1-heptene) are used as the substrate. Much lower ratios (i.e. 25 moles of olefin substrate per mole of platinum catalyst complex) are not harmful but are economically unattractive. For this reason the preferred range arrived at in Table V ranges from 50 to 200 moles of olefin per mole of platinum(II) catalyst complex.

F. Temperature Required for Carboxylation—The temperature range which can be employed for carboxylation is variable dependent upon experimental factors including the alpha-olefin employed, the pressure of carbon monoxide used, the concentration and particular choice of platinum catalyst among other things. Again using 1-heptene as a typical alpha-olefin and PtCl$_2$[As(C$_6$H$_5$)$_3$]$_2$-SnCl$_2$ as a representative catalyst, an operable temperature range is from 25 to 120° C. when superatmospheric pressures of 2000 p.s.i.g. are employed. A narrower range of 60° C. to 90° C. represents the preferred temperature range when the aforementioned olefin is carboxylated at 2000 p.s.i.g. using the catalyst system described *supra*. Table VIII is evidenciary of how this narrower range is derived.

G. Pressure—Superatmospheric pressures (of at least 100 p.s.i.g.) are required for substantial conversion of the alpha olefin to the carboxylic acid (or ester) at temperatures of 25 to 120° C. using PtCl$_2$[As(C$_6$H$_5$)$_3$]$_2$—SnCl$_2$ as catalyst and 1-heptene as the alpha-olefin. Table VII provides the supporting experimental data which establishes that pressures of 4000 p.s.i.g. or more give reduced selectivity to the linear ester while at pressures less than 100 p.s.i.g. carboxylation is impractically slow.

H. Reaction Times Required—As previously indicated in the analogous discussion on temperatures and pressures required in the reaction, experimental variables are important in arriving at reaction times. Generally, substantial conversions (70% or higher) of the olefin to the linear carboxylic acids can almost always be accomplished within 6 hours with 2 to 4 hours representing the more usual reaction time interval.

I. Alpha ($\alpha$) Olefins As substrates—Alpha-olefins ranging in carbon content from three (3) up to forty (40) carbon atmos can be employed. Illustrative linear alpha olefins substrates include 1-propene, 1-butene, 1-pentene, 1-hexene, 1-heptene, 1-octene, 1-nonene, 1-decene, 1-undecene, 1-dodecene, 1-tetradecene as well as their higher homologues such as 1-heptadecene, 1-octadecene, 1-eicosene, tricosene, 1-pentacosene, etc. Branched alpha-olefins containing 4 to 40 carbon atoms can also be carboxylated. Illustrative branched alpha-olefin substrates are 3-methyl-1-pentene, 4-methyl-1-pentene, 4,4-dimethyl-1-pentene and 3,6,9-triethyl-1-decene. These olefin substrates may be utilized neat or in conjunction with one or more inert background solvents such as the saturated paraffins including pentanes, hexanes, heptanes, octanes and the like. The alpha-olefins can be in the form of single, descrete compounds or in the form of mixtures of olefins. In the latter case these comprise mixtures of C$_3$ to C$_{30}$ carbon containing alpha olefins. Usually these mixtures have a spread of from 4 to 8 carbon atoms. Because of their relatively low cost, mixtures of alpha-olefins ranging in carbon content from C$_5$ to C$_{15}$ and upwards are favored substrates for carboxylation wherein the ligand-stabilized platinum (II) homogeneous catalysts are employed at sufficiently elevated temperatures and pressures.

J. Hydroxyl-containing co-reactions—This term as employed throughout this application refers to water and other hydroxyl-containing reactants which contain at least one hydroxyl group which is sufficiently labile during the reaction conditions of the carboxylation reaction to produce the desired carboxylated product. The physical form of the hydroxyl-containing reactant is not important, that is it can be a liquid or solid. The main other criteria is that it is capable of being dispersed or dissolved in the reaction mixture so that the carboxylated product is formed. Illustrative suitable hydroxyl-containing co-reactants include water, primary or secondary alcohols including methanol, ethanol, n-propanol, n-butanol, isopropanol, n-dodecanol, monohydric cycloalkanols containing 5 to 10 carbon atoms such as cyclohexanol phenol and substituted phenols, substituted alcohols such as 2-chloroethanol, and polyols which contain 2 or more carbon atoms and 2 or more hydroxyl groups. These include ethylene glycol, propylene glycol, glycerol, sorbitol and the like. To produce the free acid by this process water must be used as the hydroxyl-containing reactant. To produce the esters one or more paraffinic or aromatic alkanols, glycols and/or polyols must be employed as the hydroxyl-containing paraffinic reactant.

The amount of water or hydroxyl-containing paraffinic reactant used is based upon the concentration of the alpha-olefin to be converted to the carboxylate product. For maximum product yields, at least a stoichiometric quantity of "hydroxyl" reactant should be present (as stated above) dependent upon alpha-olefin concentration. This includes water as well as the alcohols, glycols and polyols. A useful molar ratio of alkanol to alpha olefin which gives good results is from 1 to 100 molar equivalents of alkanol for each molar equivalent of alpha olefin present.

---
[8] For example, R. O. Cramber *et al.*, J. Am. Chem. Soc., 85, 1691 (1963).

The favored and sole suitable reactant for producing the free acid is water; the favored hydroxyl-containing reactant being the lower alkanols, particularly those containing 1 to 12 carbon atoms.

K. Carbon Monoxide Environment—Insofar as can be determined, the best selectivities and conversions of alpha-olefins to linear fatty acids can be obtained within a reasonable time by using a substantially carbon monoxide gaseous atmosphere. However, particularly in continuous operation, the carbon monoxide may be used in conjunction with from about 0 to 30% by volume of one or more inert gases such as nitrogen, argon, neon and the like without experiencing a substantial decrease in yield and selectivity.

L. Inert Solvents—The novel carboxylation is run most conveniently in the presence of an inert diluent. A variety of solvents can be used includig aromatics such as benzene, toluene and xylenes, halogenated aromatics including ortho-dichlorobenzene, ketones like acetone and methyl isobutyl ketone, ethers such as dimethoxyethane and dioxane, and halogenated paraffins including methylene chloride. Satisfactory results are obtained when from 1 to 100 molar equivalents of inert solvent are used per molar equivalent of alpha olefin present.

M. Selectivity as described herein is the efficiency in catalyzing a desired carboxylation reaction relative to other undesired carboxylation reactions. In this instance carboxylation to the linear fatty acid or ester derivative is the desired conversion. Selectivity is usually expressed as a percentile and is calculated by determining the amount of linear carboxylated product formed, divided by the total amount of carboxylated products formed and multiplying the quotient obtained by 100.

N. Conversion as defined herein, is the efficiency in converting the alpha-olefin to non-alpha-olefin products. Conversion also is expressed as a percentile and is calculated by dividing the amount of alpha-olefin consumed during carboxylation by the amount of alpha-olefin originally charged and multiplying the quotient by 100.

O. Yield as defined herein, is the efficiency in catalyzing a desired carboxylation reaction relative to other undesired reactions. In this instance carboxylation to the linear fatty acid or ester derivative is the desired conversion. Yield is usually expressed as a percentile, and is calculated by determining the amount of linear carboxylated product formed, divided by the amount of alpha-olefin charged and multiplying the quotient obtained by 100.

P. By-Products—As far as can be determined, without limiting the invention thereby, carboxylation of $\alpha$-olefins catalyzed by the ligand-stabilized platinum (II)-Group IV-B metal halide complexes leads to the formation of only two minor by-products. These are (a) internal olefins due to $\alpha$-olefin isomerization, and (b) branched ($\alpha$-methyl) acids or esters due to CO-addition at the second carbon of the $\alpha$-olefin charge. For runs made under various experimental conditions, the extent of by-product function (normally less than 10%) is given in the following tables under percent isomerization and percent linear ester (calculated from: total linear acid ester/total linear+branched esters).

The by-products may be separated from the desired linear fatty acid or ester by the usual chemical or physical techniques, such as distillation, solvent extraction, etc.

Q. Identification procedures where applicable are by one or more of the following analytical procedures—gas chromatograph (G.C.) infrared, nuclear magnetic resonance. Unless otherwise specified all percentages are by weight rather than volume and all temperatures are in centigrade rather than Fahrenheit.

Having described the inventive process in general terms, the following examples are submitted to supply specific and illustrative embodiments.

EXAMPLE 1

Preparation of methyl caprylate using a ligand stabilized platinum(II)-stannous chloride catalyst 1A. To a reactor providing agitating, heating, cooling and pressurizing means is added a charge of 100 g. of dimethoxyethane, 10 g. of methanol (313 moles) and 10 g. of 1-heptene (108 moles). The liquid mixture is degassed and then 2.24 g. (10 mole) of stannous chloride dihydrate is added with stirring followed by 0.88 g. (1 mole) of bis(triphenylarsine)-platinum(II) chloride. After the dissolution of all solids, the reactor is sealed and pressurized to 3000 p.s.i.g. with carbon monoxide and heated to 80° C. for 3 hours. At the end of this time the reaction is terminated by cooling the reactor, venting off the gases and distilling the red solution to recover an ester product which gas chromatography (G.C.), infrared analysis, nuclear magnetic resonance (NMR) and comparison with an authenticated sample of methyl caprylate, establishes the product to be the identical ester.

1B. The same preparation is made except that the catalyst (formed *in situ* as in "1A"), the degassed solvents dimethoxyethane (100 g.) and methanol (10 g.), are heated to 80° C. with stirring under 100 p.s.i.g. of carbon monoxide. The 1-heptene (10 g.) is then added to the catalyst-solvent mixture with agitation, and the reactor sealed and pressurized to 3000 p.s.i.g. with CO. Again, after isolation, the distilled product is determined to be the methyl caprylate product of 1A.

EXAMPLE 2

Preparation of caprylic acid (octanoic acid) using a ligand stabilized platinum(II)-stannous chloride catalyst The same procedure followed in 1A is used in this run except only 5 g. (280 moles) of water is used instead of 10 g. of methanol. The other quantities of reactants, catalyst components and solvents are employed and the reaction mixture sealed and pressurized to 3000 p.s.i.g. and heated to 90° C. for 3 hours. After terminating the reaction, cooling and separation, the product is confirmed to be caprylic acid $[CH_3(CH_2)_6COOH]$ contaminated with a small amount of the 2-methyl heptanoic acid.

EXAMPLE 3

Attempted preparation of methyl caprylate using the ligand stabilized platinum catalyst of Example 1 but without stannous chloride In this preparation the procedure of Example 1A is followed exactly including the molar ratio of 1-heptene to catalyst except that the stannous chloride component of the ligand stabilized platinum(II) catalyst is omitted. Again the reaction mixture is heated to 80° C. under 3000 p.s.i.g. of CO for 3 hours. At the end of this time the liquid product found in the reactor after cooling and venting is analyzed by G.C., IR and NMR. No methyl caprylate could be detected in the product solution.

This run demonstrates that the stannous chloride is an essential component of the ligand stabilized platinum(II) catalysts of this invention.

EXAMPLES 4 TO 11

The carboxylation of various alpha, linear and branched olefins ranging from 3 carbons and up using the $PtCl_2(As(C_6H_5)_3)_2$—$SnCl_2$ as catalyst In these examples, carboxylation are carried out on the indicated olefins under the listed reaction conditions using the *in situ* procedure of Example 1A. Olefin conversion and selectivities to the ester products are disclosed in Table I.

can be used with the platinum(II)-tin(II) chloride catalyst, including ligands containing nitrogen, phosphorous,

TABLE I

Run at—80° C., 2,000 p.s.i.g of CO
With—Methyl isobutyl ketone as solvent, methanol in excess

[Carboxylation of various olefins using the $PtCl_2 (As (C_6H_5)_3)_2$—$SnCl_2$ catalyst]

| Example | Alkene | Alkene/Pt molar ratio | Reaction time (min.) | Alkene carboxylation (percent conversion) | Carboxylated products Ester | Selectivity (percent) |
|---|---|---|---|---|---|---|
| 4 | Propylene | 100 | 360 | 30 | Methyl butyrate | 76 |
| 5 | 1-heptene | 100 | 360 | 51 | Methyl octanoate | 95 |
| 6 | 1-tetradecene | 100 | 360 | 34 | Methyl pentadecanoate | 88 |
| 7 | 1-eicosene | 50 | 300 | 29 | Methyl heneicosate | >95 |
| 8 | 3-methyl-1-pentene | 50 | 480 | 74 | Methyl 4-methyl hexanoate | >99 |
| 9 | 4-methyl-1-pentene | 50 | 360 | 50 | Methyl 5-methyl hexanoate | 97 |
| 10 | 4,4-dimethyl-1-pentene | 50 | 360 | 55 | Methyl 5,5-dimethyl hexanoate | 98 |
| 11 | 2,4,4-trimethyl-1-pentene | 50 | 360 | (1) | | |

1 No reaction.

It will be seen that linear α-olefin having at least 3 to 20 carbon atoms may be carboxylated to the corresponding linear fatty acid ester using the $$PtCl_2(As(C_6H_5)_3]_2\text{—}SnCl_2$$

catalyst.

Certain branched α-olefins may also be carboxylated using the $PtCl_2(As(C_6H_5)_3)_2$—$SnCl_2$ catalyst. For example, where the α-olefin is substituted at the 3-carbon position, as in 3 methyl-1-pentene, the corresponding acid ester (in this case methyl 4-methyl hexanoate) is obtained in very high selectivity. On the other hand, where substitution is at the 2-carbon, as in 2,4,4-trimethyl-1-pentene, no carboxylation product could be detected.

EXAMPLES 12 TO 21

The carboxylation of 1-heptene to methyl octanoate using different ligand stabilized platinum(II)-stannous chloride catalyst complexes In these examples the carboxylations were carried out on 1-heptene using various platinum homogeneous catalysts under constant temperatures, pressures and substrate-to-catalyst molar ratios. Methyl isobutyl ketone was used as the solvent in all runs. As can be seen by the data presented in Table II (which follows), a variety of ligands arsenic sulfur, selenium and antimony donor atoms. These ligands may be monodentate or multidentate and may contain the alkyl and aryl groupings.

The best 1-heptene conversions and methyl octanoate yields are obtained with the bis(triphenylarsine) platinum(II) chloride-tin(II) chloride catalyst (see Example 12). The highest linear ester selectivity (i.e. linear/linear+branched molar ratio) was obtained with bis(triphenylphosphite) platinum(II) chloride-tin(II) chloride catalysts.

For each platinum catalyst, the two principal side reactions are:

(a) Isomerization of the 1-heptene to internal isomers, mainly cis and trans 2-heptenes (see Table II, col. 5).

(b) The formation of some branched (α-methyl) fatty acid ester (see Table II, col. 6). In these runs, this by-product was 2-methyl heptanoate.

The data in Table II for the ligand stabilized platinum (II)-tin(II) catalysts are in contrast to those for analogous ligand-stabilized palladium(II)-tin(II) chloride carboxylation catalysts (S.N. 223,014 filed Feb. 2, 1972) where the complexes $PdCl_2(As(C_6H_5)_3)_2$—$SnCl_2$ and $PdCl_2(Sb(C_6H_5)_3)_2$ were shown to be catalytically inactive under similar experimental conditions.

TABLE II

Run conditions—80° C., 3,000 p.s.i.g. of CO, 1-heptene/Pt=100, methanol/heptene=7.6
Reaction time—360 min., Sn/Pt=10

[Carboxylation of 1-heptene using various ligand stabilized platinum(II)-stannous chloride complexes]

| Ex. | Catalyst | 1-heptene conversion (percent) | Methyl octanoate yield (percent) | Heptene isomerization (percent) | Percent linear ester |
|---|---|---|---|---|---|
| 12 | $PtCl_2(As(C_6H_5)_3)_2$—$SnCl_2$ | 95 | 86 | 10 | 98 |
| 13 | $PtI_2(As(C_6H_5)_3)_2$—$SnCl_2$ | 8.9 | 3.4 | 4.9 | 92 |
| 14 | $PtCl_2(P(C_5H_5)_3)_2$—$SnCl_2$ | 18 | <3 | 15 | >90 |
| 15 | $PtCl_2(Sb(C_6H_5)_3)_2$—$SnCl_2$ | 12 | 3 | <1 | 95 |
| 16 | $PtCl_2(DIARS)$—$SnCl_2$ | 38 | 14 | <2 | 90 |
| 17 | $PtCl_2(DIPHOS)$—$SnCl_2$ | 25 | 7.5 | <1 | 90 |
| 18 | $PtCl_2(1,10\text{—}PHEN)$—$SnCl_2$ | 41 | 32 | 8.0 | 96 |
| 19 | $PtCl_2(P(p\text{—}CH_3\text{—}C_6H_5)_3)_2$—$SnCl_2$ | 12 | 8.4 | <1 | >90 |
| 20 | $PtCl_2(P(OC_6H_5)_3)_2$—$SnCl_2$ | 34 | 28 | <1 | 98 |
| 21 | $PtCl_2(P(n\text{-}C_4H_9)_3)_2$—$SnCl_2$ | <10 | 4 | <1 | 53 |
| 21a | $PtCl_2[S(C_6H_5)_2]_2$—$SnCl_2$ | 82 | 52 | 8.5 | 92 |

NOTE.—DIARS=Bis(1,2-diphenylarsino)ethane; DIPHOS=Bis(1,2-diphenylphosphino)ethane; 1,10-PHEN=1,10-phenanthroline.

EXAMPLES 22 TO 27

The Carboxylation of 1-heptene to methyl octanoate using different triphenylarsine platinum(II)-Group IV–B or V–B metal halide catalyst combinations In these examples, the carboxylation of 1-heptene was carried out using various combinations of triphenylarsine platinum(II) with Group IV–B and V–B metal halides, under constant temperatures, pressures, and substrate-to-catalyst molar ratios. It can be seen from the data presented in Table III that stannous iodide, stannic and plumbous salts may all be substituted for stannous chloride, while $(PtCl_2(As(C_6H_5)_3)_2)$ in combination with germanium(II) chloride is catalytically inactive.

TABLE III

Run conditions—80° C., 3,000 p.s.i.g. of CO, 1-heptene/Pt=100, methanol/heptene=7.6:1
Reaction time—360 min., Group IV–B or V–B meta /Pt=10

[Carboxylation of 1-heptane using various triphenylarsine-platinum(II)-Group IV–B or IV–B halide complexes]

| Ex. | Catalyst | 1-heptene conversion (percent) | Methy octanoate yield (percent) | Heptene isomerization (percent) | Percentage linear ester |
|---|---|---|---|---|---|
| 22 | $PtCl_2(As(C_6H_5)_3)_2$—$SnCl_2$ | 95 | 86 | 10 | 93 |
| 23 | $PtCl_2(As(C_6H_5)_3)_2$—$GeCl_3$- | <2 | | <1 | |
| 24 | $PtCl_2(As(C_6H_5)_3)_2$—$PbCl_2$ | 7.3 | 49 | <1 | >90 |
| 25 | $PtCl_2(As(C_6H_5)_3)_2$—$SbCl_3$ | 2.6 | | <1 | |
| 26 | $PtCl_2(As(C_6H_5)_3)_2$—$SnCl_4$ | 52 | 44 | <3 | 92 |
| 27 | $PtI_2(As)C_6H_5)_3)_2$—$SnI_2$ | 7.0 | 3.7 | <1 | >90 |

Again, as the results in Table III indicate, the platinum catalyst complex (as illustrated by $Pt[As(C_6H_5)_3]_2$ complexed with a Group IV–B dihalide such as ($SnCl_2$, $GeCl_2$) produce different results than do the analogous palladium complexes.[9] For example $Pd(As(C_6H_5)_3)_2I_2$—$SnI_2$ is found to be inactive, while the corresponding palladium-germanium analogues $(Pd(As(C_6H_5)_3)_2Cl_2$—$GeCl_2$ and $Pd(P(C_6H_5)_3)_2$—$GeCl_2$ are excellent carboxylation catalysts. Comparative data for the patinum and palladium catalysts are summarized in Table IV, which follows.

TABLE IV.—A COMPARISON OF PLATINUM AND PALLADIUM CARBOXYLATION CATALYSTS

Run conditions—
1-heptene/M (molar ratio)=100
Sn/M (molar ratio)=10
Solvent=Methyl isobutyl ketone
Temp. 80° C.
CO pressure 3,000 p.s.i.g.
Time 360 min.

| Catalyst | M=Pd | M=Pt |
|---|---|---|
| $MCl_2(P(C_6H_5)_3)_2$—$SnCl_2$ | Active | Active. |
| $MCl_2(As(C_6H_5)_3)_2$—$SnCl_2$ | Inactive | Do. |
| $MCl_2(Sb(C_6H_5)_3)_2$—$SnCl_2$ | do | Do. |
| $MI_2(P(C_6H_5)_3)_2$—$SnI_2$ | do | Do. |
| $MI_2(As(C_6H_5)_3)_2$—$SnI_2$ | do | Do. |
| $MCl_2(P(C_6H_5)_3)_2$—$GeCl_3$- | Active | Weakly active. |
| $MCl_2(As(C_6H_5)_3)_2$—$GeCl_3$- | do | Inactive. |

[9] SN 223,014 filed February 2, 1972.

EXAMPLES 28 TO 31

Synthesis of methyl octanoate from 1-heptene the effect of varying the stannous chloride to bis(triphenylarsine)-platinum(II) chloride molar ratio In this group of examples, 1-heptene is again used as the alpha-olefin and $PtCl_2[As(C_6H_5)_3]_2$—$SnCl_2$ is the catalyst employed. Keeping the reaction conditions constant, a favored range of stannous chloride can be determined by examining Table V which follows.

As can be seen from the data presented, the molar ratio of stannous chloride to bis(triphenylarsine)-platinum(II) chloride may be raised at least from 1 to 30. The preferred range of Sn:Pt molar ratios is from 5 to 10 moles of Sn to Pt.

TABLE V

Run conditions—80° C., 3,000 p.s.i.g. of CO
Reaction time—360 min.

[Carboxylation of 1-heptene using bis(triphenylarsine) Platinum(II) chloride-tin(II) chloride, molar ratio changes—I]

| Ex. | Molar ratios of— | | | 1-heptene conversion (percent) | Methyl octanoate yield (percent) | Heptene isomerization (percent) | Percent linear esterr |
|---|---|---|---|---|---|---|---|
| | $PtCl_2(As\phi_3)_2$ | $SnCl_2$ | 1-heptene | | | | |
| 28 | 1 | 1 | 100 | 20 | 15 | <1 | >90 |
| 29 | 1 | 5 | 100 | 63 | 56 | 5.9 | 92 |
| 30 | 1 | 10 | 100 | 95 | 86 | 10 | 93 |
| 31 | 1 | 30 | 100 | 64 | 35 | 86 | 92 |
| 32 | 1 | 10 | 1000 | 5 | <5 | <1 | 90 |
| 33 | 1 | 10 | 500 | 11 | 6.0 | <1 | >90 |
| 34 | 1 | 10 | 250 | 34 | 15 | <1 | >90 |
| 35 | 1 | 10 | 25 | 100 | 61 | 11 | 88 |

EXAMPLES 32 TO 35

Synthesis of methyl octanoate from 1-heptene—the effect of varying the α-olefin to platinum molar ratio In this group of examples, $PtCl_2[As(C_6H_5)_3]_2$—$SnCl_2$ was again the catalyst employed. The experimental procedure was similar to that described in Example 1A, and keeping the reaction conditions constant, a favored range of olefin to platinum catalyst ratio can be determined by examining Table V.

As can be seen from the data presented, the molar ratios of α-olefin to platinum catalyst may be varied at least from 25 to 1000. The preferred range is from 50 to 200.

EXAMPLES 36 TO 39

Synthesis of methal octanoate from 1-heptene—the effect of changing the α-olefin to methanol molar ratio In this series of experiments, 1-heptene and methanol are again the reactants, and $PtCl_2[As(C_6H_5)_3]_2$—$SnCl_2$ is the catalyst complex. Keeping the other reaction conditions constant, the methanol-to-1-heptene molar ratio is varied from 0.5 to 25.

It is apparent from the data in Table VI, which follows, that at least a molar equivalent of methanol-to-α-olefin is necessary to ensure good yields of the linear fatty acid ester.

The same was found to be true when water is substituted for methanol in the reaction mixture to make the linear fatty acid.

EXAMPLES 47 TO 52

Synthesis of methyl octanoate from 1-heptene—the effect of varying reaction temperatures In this procedure the techniques of Example 1A are employed, $PtCl_2[As(C_6H_5)_3]_2$—$SnCl_2$ is the catalyst complex, and reaction pressures are kept at 2000 p.s.i.g. to determine the effect of varying the reaction temperature on the 1-heptene conversion and the methyl octanoate selectivity. As can be seen from Table VIII, reactions run below 60° C. are slow, while operating temperatures above 90° C. cause catalyst decomposition. The most favorable balance of conversion, selectivity and reaction time are obtained with carboxylations run at temperatures between 60° C. and 90° C.

TABLE VI

[Carboxylation of 1-heptene using bis(triphenylarsine) platinum(II) chloride-tin(II) chloride, molar ratio changes—II]

Run conditions—80°C., 3,000 p.s.i.g. of CO
Reaction time—360 min.

| Ex. | Molar ratios of— | | | | 1-heptene conversion (percent) | Methyl octanoate yield (percent) | Percent linear ester |
|---|---|---|---|---|---|---|---|
| | $PtCl_2(As\phi_3)_2$ | $SnCl_2$ | 1-heptene | Methanol | | | |
| 36 | 1 | 10 | 100 | 2,500 | 93 | 84 | 91 |
| 37 | 1 | 10 | 100 | 750 | 95 | 86 | 93 |
| 38 | 1 | 10 | 100 | 100 | 93 | 81 | 94 |
| 39 | 1 | 10 | 100 | 50 | 100 | 34 | 95 |

EXAMPLES 40 TO 46

Synthesis of methyl pentadecanoate from 1-tetradecene—the effect of varying the carbon monoxide pressure In this procedure, using the techniques disclosed in Example 1A, and keeping the reaction temperature constant, the effect of varying the carbon monoxide pressure on the methyl pentadecanoate selectivity and the 1-tetradecene conversion is determined. As the data in Table VII, which follows, indicate the rate of carboxylation is slow at CO pressures below 700 p.s.i.g., while the methyl pentadecanoate selectivity (i.e., the linear/linear+branched ratio, column 7) drops off at CO pressures of 4000 p.s.i.g. or more due to the formation of additional branched (2-methyl) fatty acid ester. This loss of selectivity may be partially compensated for by working or operating at lower temperatures (see example 46). The preferred range of carbon monoxide pressures to operate under, based upon the most favorable balance between conversion, selectivity and reaction time, is therefore from about 2000 to 4000 p.s.i.g.

TABLE VIII

[Carboxylation of 1-heptene using bis (triphenylarsine) platinum (II) chloride—tin (II) chloride, changes in reactor temperature]

| Example | Olefin | Solvent | Reaction temp (° C) | Pressure of CO (p.s.i.g.) | 1-olefin conversion | Yield of linear methyl ester | Isomerization | Percent linear ester |
|---|---|---|---|---|---|---|---|---|
| 47 | 1-heptene | MIK a | 25 | 2,000 | <2 | <1 | <1 | b N.D0 |
| 48 | do | MIK a | 60 | 3,000 | 41 | 31 | 8.6 | 9. |
| 49 | do | MIK a | 80 | 2,000 | 67 | 48 | 15 | 87 |
| 50 | do | MIK a | 90 | 2,000 | 65 | 44 | 25 | 97 |
| 51 | do | MIK a | 105 | 2,000 | 58 | 8.7 | 18 | >91 |
| 52 | do | MIK a | 120 | 2,000 | 50 | <5 | N.D. | 90 | a MIK=Methyl isobutyl ketone.
b N.D.=Not determined.

EXAMPLES 53 TO 60

Synthesis of methyl pentadecanoate from 1-tetradecene—the effect of changing the solvent media In this procedure, using the techniques disclosed in Example 1A, $PtCl_2(As(C_6H_5)_3)_2$—$SnCl_2$ as catalyst, and keeping the temperatures and CO pressures constant, the effect of changing the solvent media upon the activity of the platinum catalyst is determined. As the data of Table IX show, the carboxylation of α-olefins catalyzed by ligand stabilized platinum (II)-tin(II) complexes may be carried out in a variety of solvents, including ketones, such as

TABLE VII

[Carboxylation of 1-tetradecene using bis(triphenylarsine) platinum (II) chloride-tin (II) chloride, changes in CO pressure]

| Example | Olefin | Solvent | Reaction temp (° C) | Pressure of CO (p.s.i.g.) | Tetradecene carboxylation (percent conversion) | Methyl pentadecanoate selectivity (percent) |
|---|---|---|---|---|---|---|
| 40 | 1-tetradecene | Dimethoxyethane | 93 | 100 | <1 | |
| 41 | do | do | 93 | 700 | * CD | >98 |
| 42 | do | do | 93 | 1,000 | 21 | 93 |
| 43 | do | do | 93 | 2,000 | 31 | 90 |
| 44 | do | do | 93 | 3,000 | 37 | 88 |
| 45 | do | do | 93 | 4,000 | 41 | 76 |
| 46 | 1-heptene | do | 80 | 5,000 | 54 | 92 |

* CD—Could not be determined.

acetone and methyl isobutyl ketone, ethers like dimethoxyethane and dioxane, alcohols, aromatics and halogenated solvents such as methylene chloride.

TABLE IX

Run conditions—90° C., 3,000 p.s.i.g. of CO.
Reaction time—360 min.

[Carboxylation of 1-tetradecene using bis(triphenylarsine) platinum(II) chloride-tin(II) chloride, changes in solvent media]

| Example | Solvent | Tetradecene carboxylation (percent conversion) | Methyl pentadecanoate selectivity (percent) |
|---|---|---|---|
| 53 | Acetone | 38 | 87 |
| 54 | Methyl isobutyl ketone | 34 | 88 |
| 55 | Tetrahydrofuran | 20 | 84 |
| 56 | p-Dioxane | 21 | 88 |
| 57 | Dimethoxyethane | 37 | 87 |
| 58 | Benzene/methanol | 27 | 92 |
| 59 | Methylene chloride | 48 | 87 |
| 60 | Dimethylformamide | <2 | |

EXAMPLES 61 TO 67

Synthesis of other $C_8$ linear acid esters from 1-heptene

In these seven examples, the same experimental procedure as described in Example 1A is used except that ethanol, isopropanol, phenol, dipropylene glycol, 1-dodecanol, 2-chloroethanol and cyclohexanol are each substituted for methanol as the hydroxyl-containing reactant. The other quantities of reactants, catalyst and solvent are employed and the reaction mixture sealed and pressurized to 3000 p.s.i.g. and heated to 80° C. After terminating the reaction and cooling, the expected ester products are identified using the usual analytical methods described previously.

As the numerous examples and preceding discussion have documented, numerous unexpected advantages accrue from the practice of this invention both in its compositional aspect and its process aspects.

For example, a relatively large group of ligand stabilized platinum(II) -Group IV–B metal halide catalysts are provided which were heretofore not known to be useful as catalysts for the carboxylation of alpha-olefins to either their esters or to the free acids. Completely unexpected and surprising is that some of the palladium analogues are inactive for carboxylation of alpha olefins. (See Table IV.) This is contrary to the usual analogous behavior of platinum and palladium catalysts. The platinum catalyst compositions offer the further advantage of being readily available by well known preparative procedures and they have carboxylation efficacies even at substrate to catalyst molar ratios as high as 500 to 1000 to 1 molar ratios, dependent upon the olefin substrate and the particular catalyst employed.

In its process aspect this invention provides a novel process for carboxylating relatively low value alpha-olefin to more costly linear fatty acids or esters. In addition, reaction times are rapid, the process lends itself to either batch or continuous operation, employing standard equipment. Further, the conversions of alpha olefin are ordinarily above 70% and selectivites to the linear acid or ester are of the order of 85% and higher.

A further advantage of the instant invention is that while some reaction conditions are critical, other process conditions are more flexible. That is, numerous modifications and changes can be made in catalyst, hydroxylated reactant and alpha-olefins, without departing from the inventive concept. The metes and bounds can best be determined by reading the claims which follow in light of the preceding specification.

What is claimed is:

1. A process for preparing linear, carboxylated paraffinic products from the catalytic reaction of alpha-olefins containing from about 3 to 40 carbon atoms, carbon monoxide and hydroxyl-containing co-reactants by:

(a) Admixing each molar equivalent of alpha-olefin to be carboxylated with at least one molar equivalent of a hydroxyl containing co-reactant, consisting of water or a hydroxyl-containing reactant having a carbon content of 1 to 12 carbon atoms and at least a catalytic amount of homogeneous, ligand stabilized, platinum(II) Group IV–B metal halide catalyst complex, said catalyst being selected from the group consisting of

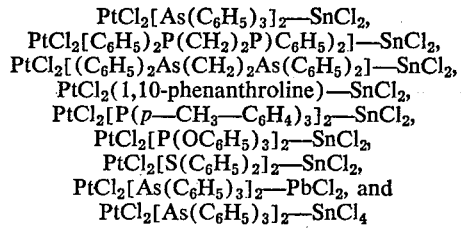

in an oxygen-free environment, in the presence of a pressurized carbon monoxide atmosphere ranging from about 2000 to 4000 p.s.i.g., to form a pressurized reaction mixture;

(b) Heating said pressurized reaction mixture at 60° C. to 90° C. until substantial carboxylation of the alpha-olefin to the desired carboxylated product is formed, and separating the carboxylated products contained therein.

2. The process of Claim 1 wherein the reaction admixture contains as its hydroxyl-containing co-reactant, water and the carboxylated product is a linear paraffinic acid.

3. The process of Claim 1 in which the reaction mixture contains as its hydroxyl-containing, co-reactant a member selected from the group consisting of paraffinic linear and cyclic alkanols, glycols, polyols, substituted phenols and their mixtures, and the carboxylated product is an ester of a linear paraffinic acid.

4. The process of Claim 1 wherein said homogeneous catalyst complex is preformed prior to the formation of the reaction mixture.

5. The process of Claim 1 wherein said homogeneous, ligand stabilized catalyst is prepared in situ by adding as separate components the stabilizing ligand, platinum dichloride and Group IV–B metal halide.

6. The process of Claim 4 wherein the Group IV–B metal halide is contacted with the ligand stabilized platinum(II) dichloride in inert solvent to form the ligand stabilized platinum(II) Group IV–B metal halide complex.

7. The process of Claim 5 wherein the Group IV–B metal halide is stannous chloride.

8. The process of Claim 3 wherein the alkanol is a monohydric alcohol of up to twelve carbon atoms.

9. The process of Claim 3 wherein the alkanol is a monohydric cycloalkanol containing 5 to 10 carbon atoms.

10. The process of Claim 3 wherein the alkanol is a polyol containing 2 or more carbon atoms and 2 or more hydroxyl groups.

11. The process of Claim 1 wherein the alpha-olefin to be carboxylated is a straight-chain (linear) alpha-olefin containing 3 to 40 carbon atoms.

12. The process of Claim 1 wherein the alpha-olefin to be carboxylated is a branched alpha-olefin containing 4 to 40 carbon atoms.

13. The process of Claim 1 wherein a mixture of alpha-olefins is used as a reactant, said olefins having a spread of from 4 to 8 carbon atoms.

14. The process of Claim 1 wherein the platinum(II) catalyst complex is

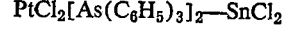

15. The process of Claim 1 wherein the platinum(II) catalyst complex is

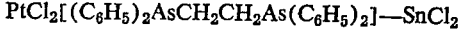

16. The process of Claim 1 wherein the platinum(II) catalyst complex is

17. The process of Claim 1 wherein the platinum(II) catalyst complex is (1,10-Phenanthroline) Platinum(II) chloride-tin(II) chloride.

18. The process of Claim 1 wherein the platinum(II) catalyst complex is

19. The process of Claim 6 in which the inert solvent used to solubilize the platinum(II) catalyst is selected from a group of solvents consisting of aromatics, ketones, ethers and halogenated paraffins.

20. The process of Claim 1 for preparing esters of linear paraffinic carboxylic esters in which the alkanol is methanol, and the linear fatty acid and ester product is a methyl ester.

21. A process for preparing linear fatty acid esters from alpha olefins containing 5 to 15 carbon atoms or mixtures thereof, comprising the steps of admixing each molar equivalent of said alpha olefin to be carboxylated with:
(a) from 1 to 100 molar equivalents of an alkanol,
(b) from 0.005 to 0.02 molar equivalents of bis-(triphenylarsine) platinum(II) chloride complex,
(c) from 0.025 to 0.2 molar equivalents of stannous chloride, and
(d) from 1 to 100 molar equivalents of inert solvent to form a reaction mixture, pressurizing said mixture with from 2000 to 4000 p.s.i.g. of carbon monoxide, while heating from 60 to 90° C. until the linear fatty acid ester is formed.

22. The process of Claim 21 in which the alpha olefin to be carboxylated is 1-heptene, the alkanol is methanol, and the linear fatty acid ester product is methyl octanoate.

References Cited
UNITED STATES PATENTS

| | | | |
|---|---|---|---|
| 2,876,254 | 3/1959 | Jenner et al. | 260—486 |
| 3,657,368 | 4/1972 | Parshall et. al. | 260—666 A |
| 3,660,439 | 5/1972 | Schell | 260—410.9 R |
| 3,681,415 | 8/1972 | Schell | 260—410.9 R |
| 3,668,249 | 6/1972 | Fenton | 260—546 |
| 3,641,074 | 2/1972 | Fenton | 260—410.9 |
| 3,700,706 | 10/1972 | Butler | 260—410.9 R |

OTHER REFERENCES
Keyhoe et. al., J. Org. Chem., vol. 35 (8) 2846–8 (Aug., 1970).

LEWIS GOTTS, Primary Examiner

DIANA G. RIVERS, Assistant Examiner

U.S. Cl. X.R.

260—408, 410.5, 413, 497 A, 533 A, 410